Jan. 7, 1947.   R. J. SHARP   2,413,792
COVER MEANS FOR MECHANISM OF AUTOMOTIVE VEHICLES
Filed May 22, 1943   4 Sheets-Sheet 1

RENWICK J. SHARP,
INVENTOR,
BY
ATTORNEY.

Jan. 7, 1947. R. J. SHARP 2,413,792
COVER MEANS FOR MECHANISM OF AUTOMOTIVE VEHICLES
Filed May 22, 1943 4 Sheets-Sheet 2
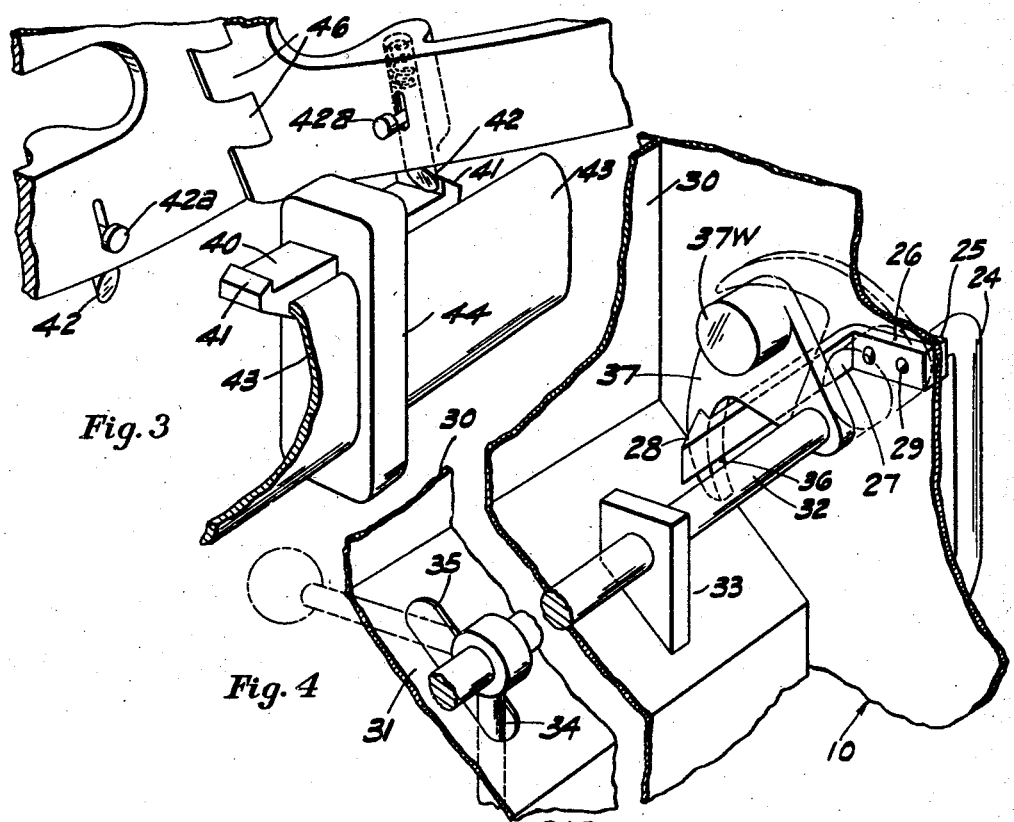
Fig. 3
Fig. 4
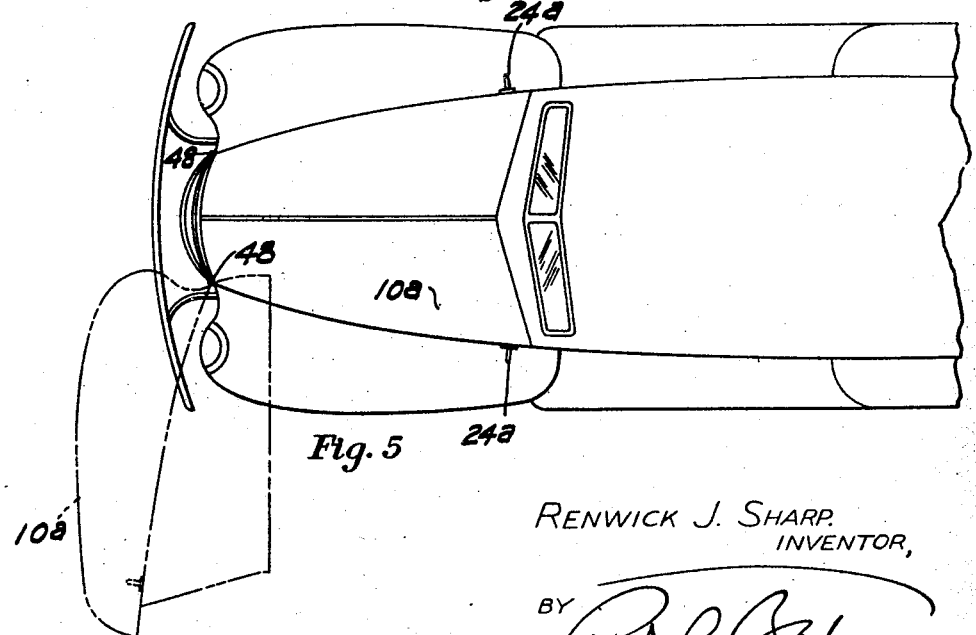
Fig. 5
RENWICK J. SHARP.
INVENTOR,
BY
ATTORNEY.

Jan. 7, 1947.  R. J. SHARP  2,413,792
COVER MEANS FOR MECHANISM OF AUTOMOTIVE VEHICLES
Filed May 22, 1943  4 Sheets-Sheet 3

RENWICK J. SHARP.
INVENTOR.
BY
ATTORNEY.

Jan. 7, 1947.                R. J. SHARP                2,413,792
            COVER MEANS FOR MECHANISM OF AUTOMOTIVE VEHICLES
                    Filed May 22, 1943           4 Sheets-Sheet 4

RENWICK J. SHARP
            INVENTOR,
BY
            ATTORNEY.

Patented Jan. 7, 1947

2,413,792

UNITED STATES PATENT OFFICE 2,413,792

COVER MEANS FOR MECHANISM OF AUTOMOTIVE VEHICLES

Renwick J. Sharp, Guatemala, Guatemala

Application May 22, 1943, Serial No. 488,306

29 Claims. (Cl. 180—69)

This invention relates to means for covering parts of the operating mechanism of automotive vehicles, and more specifically to a hood or bonnet and fender construction.

Prior constructions involving the use of parts for enclosing the engine and adjacent portion of the chassis have been dominated by a design in which the bonnet and fender part per se have always been considered separate units, the fenders which shield the wheels adjacent the motor often-times being rigidly secured to the chassis.

In order to obtain ready access to the operative mechanism of the vehicle for repair or lubrication, the inspection of which has hitherto always been hampered by the presence of immovable parts, it is necessary for the workman to lean and work over exposed polished portions of the vehicle body which places the position of the parts to be repaired or lubricated out of his convenient reach. Also this reduces the efficiency of the mechanic, and subjects the polished surfaces of the intervening parts to becoming soiled and damaged especially in view of the fact that they suggest a convenient support and consequently have placed upon them the mechanic's tools and accessories. They also on account of sheer necessity are utilized for supports for the heavy engine parts undergoing repairs necessitating their removal and replacement.

Furthermore, the inability to display to the public the essential operative parts in show rooms and at places where automotive vehicles are on exhibition has often prevented salesmen from adequately demonstrating some utilitarian feature, and making clear their point of view. This has been due to the fact that the part being elaborated upon has been hitherto obscured from the clear view of the person being addressed by the salesman.

It is among the more important objects of the invention to provide for the elimination of the above recited disadvantages, by furnishing an integral construction of bonnet and fender parts which may be as a whole so positioned as to expose the entire operative mechanism as well as the adjacent vehicle wheels in full and unobstructed view for whatever purposes desired.

Still other objects of the invention reside in the provision of a wheel fender which is movable to and from an overlying relation to the wheel which it fends; and to provide for strengthening the wheel fenders by uniting with each of them a hood member thereby enabling the parts thus combined better to withstand the shocks and impacts to which they are subjected.

Yet other more specific objects relate to improved means for opening up the cover member over the engine and wheels so as to afford unprecedented accessibility to the motor, knee-action, wheels and their steering devices, without the use of special tools for avoiding damage to the car body; to facilitate removal of bumps and thereafter repainting marred surfaces; and to produce a structure wherein no problem is presented as to the electric wiring, only a single removal plug being involved for each head lamp. Also it is an object to lessen cost of manufacture in material and man hours, it being possible to stamp each bonnet in one piece.

Together with the foregoing and other objects in view, the invention still further resides in the novel arrangement and novel combination of parts and the novel details of construction hereinafter more fully described and claimed, it being understood that the invention is not limited in its application to the details of construction and arrangement of parts illustrated in the accompanying drawings, since the invention is capable of other embodiments and being practiced or carried out in possible various other ways. Also, it is to be understood that the phraseology or terminology employed herein is for the purposes of description and not one of limitation, and it is not intended to limit the herein claimed invention beyond the requirements of prior art.

Referring to the accompanying drawings which illustrate what is at present deemed to be preferred embodiments of the invention, Fig. 1 is a view in plan of one preferred embodiment of the invention showing one bonnet closed and one extended, said bonnets being attached to the front end of an automotive vehicle.

Fig. 3 is an enlarged fragmentary perspective view of the means for holding the improved device in the extended or inoperative position, as viewed from the line 3—3 of Fig. 1.

Fig. 4 is an enlarged fragmentary perspective view of the locking mechanism for holding the improved device in the closed or operative position, as viewed from the line 4—4 of Fig. 1.

Fig. 5 is a view of another of the preferred embodiments of the invention, showing the same in plan. In this embodiment the swingable parts operate about a vertical pivot.

Figure 1:
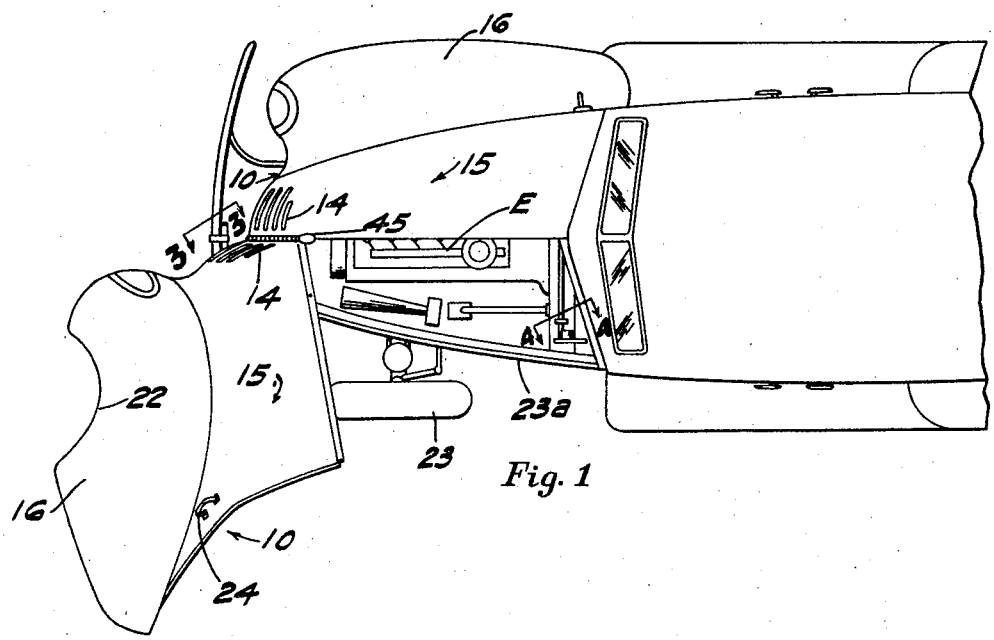
Figure 2:
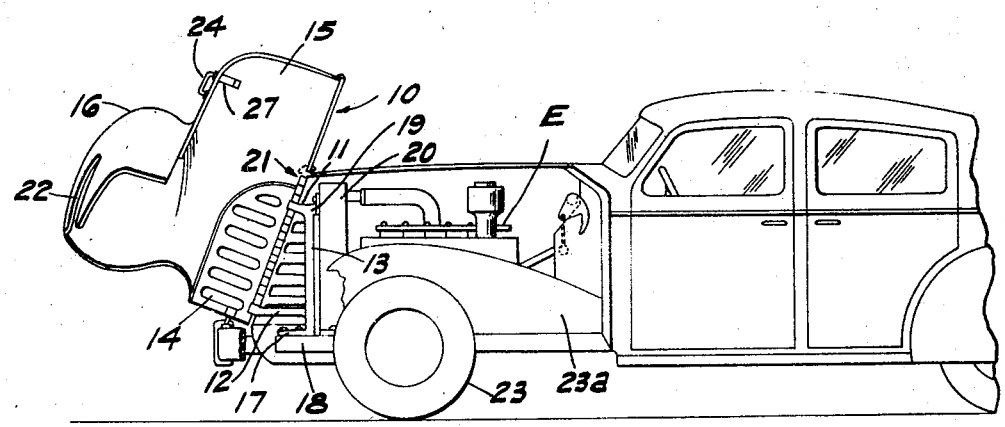
Fig. 2 is a side elevation of the structure shown in Fig. 1.

Referring in detail to Figs. 1 to 4 of the drawings, in these views is illustrated an embodiment of the invention wherein paired twin bonnets 10 are hinged to the front ends of the arms 11 and 12 of the radiator frame 13, this frame being triangular with its apex directed upwardly. Each of said bonnets includes a grille portion 14, a body portion 15 and a fender portion 16. Said radiator frame has a foot portion 17 which is bolted or otherwise secured to the front end portion of the chassis 18, the upper part of said frame having a backward extension 19 which is secured to the radiator 20 in any suitable manner in order to stabilize the structure to which the bonnet is hinged. The engine E is shown occupying its usual position.

The upper arm 11 of the upstanding radiator frame 13 is shorter than its lower arm 12 and both of said arms are deflected upwardly somewhat near their outer ends, thus providing for supporting the bonnet hinge 21 at an inclination with its upper part located rearwardly of its lower part.

The fender portion 16 of the bonnet 10 is scalloped or concaved at 22 in order to provide a clearance for moving the front wheel 23 of the vehicle when the bonnet is in its closed position. The top portion of said bonnet swings over and clears the mud-guard apron 23a which is placed between the engine E and the wheel 23 and is secured to the vehicle chassis. Said apron is contoured to cooperate with the overlying part of the swingable member when the latter is in its inswung position.

The bonnet 10 is furnished in the lower part of its rear (when closed) portion with a U-shaped operating handle 24 one end of which is attached to the bonnet by any preferred conventional means and the opposite end portion of which has an expanded attaching portion 25 as shown in Fig. 4. Said handle portion 25 abuts against the outer side of the metal sheet of which the bonnet is made and opposite to it, against the inner side of the bonnet, abuts the short limb 26 of an angular arm plate 27 which has a beveled terminal catch shoulder 28. Said parts 25 and 26 are shown secured to each other and to the bonnet by rivets 29.

Adjacent to the rear wall of the instrument panel 30 and supported in part by the inclined plate 31 at the base thereof is a horizontally extending rock shaft 32 which is supported near each side of the vehicle by a bearing member 33 which upstands from said inclined plate 31 girdling said bumper. The mid-length part of said shaft 32 has fixed to it a radially extending knobbed operating arm 34 which is manually swingable in a slot 35 in said plate 31. In Fig. 4 the driver is assumed to be facing the observer, hence it is convenient for the former to reach his hand under the inclined plate 31 to grasp said handle 34 and swing it rearwardly and upwardly to the dotted line position shown. Doing this rocks the shaft 32 and causes the arcuate finger 36 of a dog 37 fixed to said shaft to be withdrawn from its restraining relation to the aforesaid catch arm which forms a part of the swingable bonnet 10. Said dog carries a counterweight 37w which aids in bringing the shaft 32 and parts carried thereby to their normal position in full lines shown in Fig. 4.

Owing to the inclination of the axis about which the bonnet 10 swings, said bonnet tends to swing toward its closed position by gravity necessitating the provision of a catch means to releasably maintain it in the open position during the time while access is desired to the engine and parts adjacent thereto. Accordingly the catch construction detailed in Fig. 3 is provided, the stationary part of which consists of a horizontal catch bar 40 each end of which is furnished with a beveled catch shoulder 41; and each bonnet carries a spring-pressed, slidable catch bolt 42 which glides over the beveled shoulder 41 just before the bonnet reaches its completely open position and then is forced outwardly by its spring into its locking position, as shown in Fig. 3. Said catch bolt 42 carries an operating finger 42a. Said catch bar 40 extends parallel to the bumper 43 to which it is secured by a mounting block 44.

A single hinge pin 45 suffices for the hinge portions of both bonnets, and the adjacent wall portion of each bonnet is provided with a series of equally spaced apart hinge ears 46 which embrace said rod, these two sets of hinge ears interfitting as most clearly shown in Fig. 3. The bonnets 10 are positioned to swing clear of the mud-guards or aprons 23a.

In Fig. 5 is shown a second embodiment of the invention wherein each of the paired twin bonnets 10a has its own hinge 48. These hinges are located equidistant from the median line of the vehicle and at substantially the front extremity of each of the bonnets. The axis of each of these hinges extends vertically and hence these bonnets swing in a true horizontal plane and no latch or catch is required to prevent them from swinging toward closed position. Said bonnets 10a include the same cover or wall portions as those already described. They also have like handles 24a and interiorly of these handles like releasable means for locking them in the closed position, and are positioned to swing clear of the mud-guard aprons like those previously described.

Figure 6:
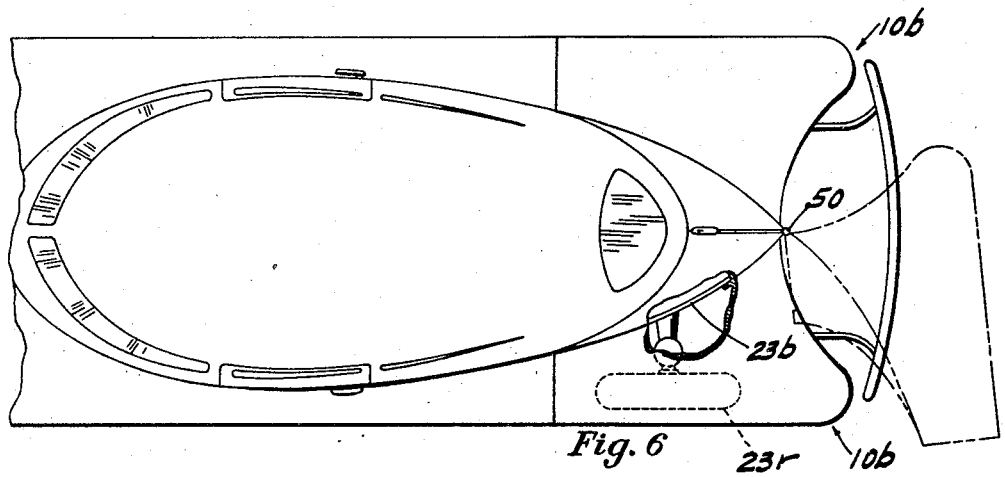
Fig. 6 is another embodiment of the invention in plan showing the device in full lines closed and in dotted lines open. The structure of this embodiment is located at the rear of the vehicle, a portion thereof being broken away to disclose underlying parts.
Figure 7:
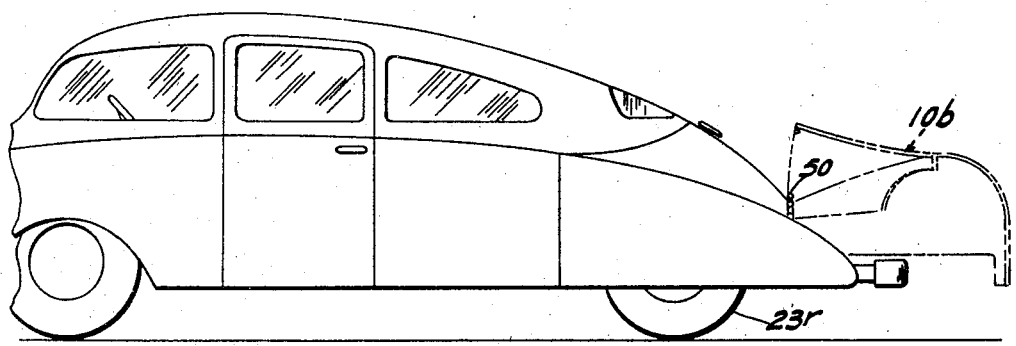
Fig. 7 is a side elevation of the structure shown in Fig. 6.
Figure 8:
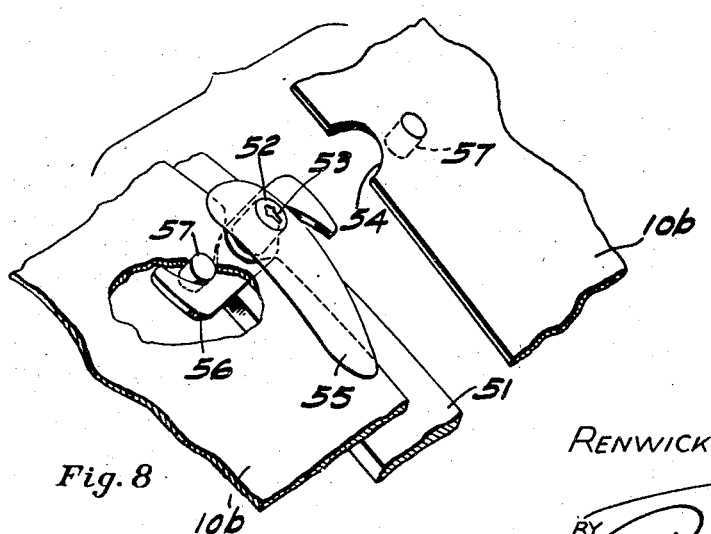
Fig. 8 is a perspective view showing on an enlarged scale the means for holding the associated parts in the closed position.

In Figs. 6, 7 and 8 is shown an embodiment of the invention applicable to a type of automobile having the engine located in its rear portion. In this form of the invention the twin bonnets 10b have a common vertical hinge pin 50 which is located at the most rearward point of the midwidth part of the chassis. In Fig. 6, 23r designates a rear wheel and 23b the apron which forms the mud-guard. Since the bonnets 10b swing about a vertical pivot no catch or locking means is required to maintain them in the open position, but a means is required to lock them in their closed position.

For this purpose a forwardly and rearwardly extending back frame piece 51 is provided, from which projects upwardly the lock barrel 52 having a keyhole 53, each bonnet 10b having in its edge a semicircular notch 54, these opposed notches providing a circular clearance for said barrel. When, by means of a key, the barrel is unlocked for turning the handle 55, then said handle can be swung to the position for unlocking the double locking arm 56, which is in a fixed relation to said handle, thus unlocking the locking portions of said arm 56 from a downwardly projecting locking stud 57 carried by each bonnet 10b. When the bonnets 10b are closed the aforesaid frame strip 51 weatherproofs the joint between them. Said frame strip may be detachably secured to the chassis in order to permit of its removal when it is desired to take out the engine.

Figure 9:
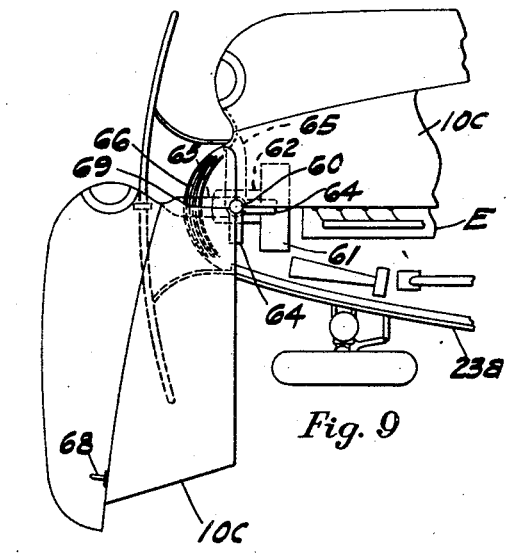
Fig. 9 is a plan view of another preferred embodiment of the invention, wherein the hinge structure has a vertical axis and the grille is independent of the swingable bonnets, one of which is shown open and the other closed. This view is contracted by showing only the front portion of the vehicle and by breaking away part of one of the bonnets.
Figure 10:
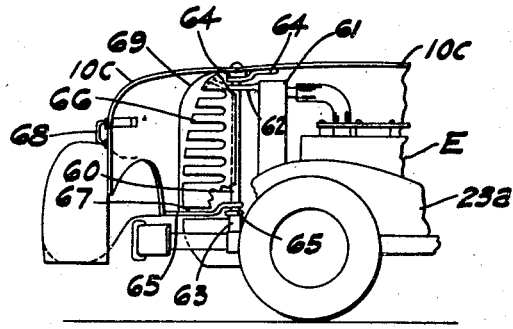
Fig. 10 is a side elevation of the structure shown in Fig. 9, parts being broken away in order more clearly to disclose underlying structure.

In the embodiment of the invention shown in Figs. 9 and 10, the twin bonnets 10c are hinged to the front portion of the vehicle by means of a vertical hinge pin 60 common to both bonnets located in front of the radiator 61, said hinge pin being supported by a forward extension 62 of the upper portion of the radiator and a lower bearing block 63 which is carried by the lower part of the front portion of the chassis. The upper part of each bonnet 10c is closely connected with the upper portion of the hinge pin 60 by means of a hinge ear or clip 64 secured to the inner side of the bonnet, one of these ears being offset to afford room for the other; but the lower portion of each bonnet is somewhat remotely connected with said hinge pin by means of an arm 65 which is secured to the lower part of the bonnet, there being provided beneath the grille 66 a clearance 67 through which each of said arms 65 swings, the grille 66 in this embodiment not being a part of the bonnets. Adjacent to the hinge pin 60, the arm 65 of one bonnet is offset from the other to provide the free swinging movement desired. Each of these bonnets is provided in its front portion with a suitable handle 68 and at its hinged end with an arcuate opening 69 to unobstruct its swing in relation to the grille 66. The bonnets 10c shown in Figs. 9 and 10 are arranged to swing clear of the mud-guards 23a. The locking device of the bonnets 10c shown in Fig. 10 is constructed in the same manner as the locking device shown in Fig. 4.

Figure 11:
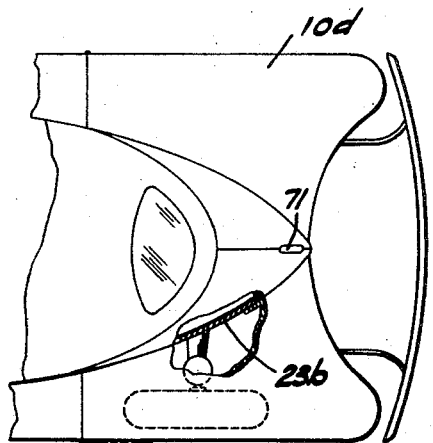
Fig. 11 is a plan view of another embodiment of the invention, wherein the bonnets, one of which is shown closed and the other open, are hinged to the rear portion of the vehicle, by hinges having vertical axes and located at the sides of the vehicle. This view is contracted by including only the rear portion of the vehicle.
Figure 12:
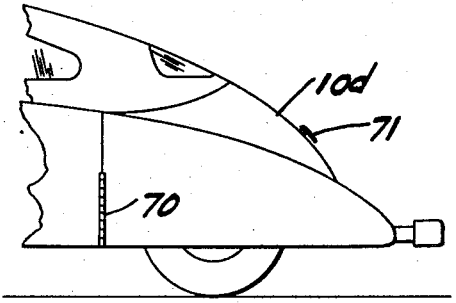
Fig. 12 is a side elevation of the structure shown in Fig. 11.

In the embodiment of the invention shown in Figs. 11 and 12 each of the twin bonnets 10d has its front end hinged to the vehicle by a vertical hinge 70 located at the side of the vehicle to permit the twin bonnets 10d, when closed, to extend to the rear end of the vehicle. The locking device 71 for the bonnets 10d is constructed in the same manner as the already described locking device shown in Fig. 8. The mud-guard aprons 23b are out of the path of the swing of the bonnets 10d.

In all the illustrated embodiments of the invention the various hinges of the bonnets have upstanding axes and therefore all the bonnets described swing either in a truly horizontal plane or else sufficiently near thereto to carry out that object of the invention which has already been mentioned, namely, a more complete and unobstructed access to the parts which the various hoods enclose or overlie. Also in all embodiments the bonnet structures provided include a wheel fender part which is swingable with the bonnet to a position which affords unobstructed access to the wheel whenever that is desired.

Although in certain of the views the bonnets are shown extending out from the vehicle to a considerable distance, yet it is to be understood that, as a space economizing measure, their hinges may be provided with removable hinge pins thus permitting the bonnets to be detached and placed in an out of the way situation while the engine and parts adjacent thereto are being repaired or adjusted.

What is claimed is:

1. In combination with a vehicle chassis a part including a wheel fender, means whereby said part is pivotally attached to the midwidth of said chassis to swing about an upstanding axis in a substantially horizontal direction from and to an overlying relation to a wheel of the chassis, and a stationary apron attached to said chassis, said apron occupying a position between said engine and the adjacent wheel of the chassis over which said part swings, said apron being contoured to interfit with the overlying part of the swingable part when the latter is in its inswung position.

2. In a vehicle chassis, a pair of combined hood and fender parts for enclosing the operative parts of an automotive structure and the adjacent wheels of the chassis, a single pivot means which affords a common axis about which both of said combined parts swing in a horizontal plane, a stationary apron attached to said chassis, said apron occupying a position between said engine and the adjacent wheel of the chassis over which said combined hood and fender parts swings, said apron being contoured to interfit with the overlying part of said combined hood and fender part when the latter is in its inswung position, and a common locking means for securing said combined hood and fender parts in their operative positions.

3. In a vehicle chassis, a pair of unitary structures each comprising an engine-enclosing part and including a fender, a single hinge pin attaching said unitary structures to swing about an upstanding axis to and from an enclosing relation to said engine, and mounting means for said hinge pin comprising a radiator having a forwardly extending arm carried by its upper portion forming a support for the upper part of said hinge pin.

4. The subject matter of claim 3, and a stationary apron attached to said chassis, said apron occupying a position between said engine and the adjacent wheel of the chassis over which said engine-enclosing parts swing, said apron being contoured to cooperate with a part of said swingable structure.

5. The subject matter of claim 3, and a common locking means for securing said pair in their operative positions.

6. A motor vehicle structure including a chassis, an engine and radiator supported by said chassis in the front portion of the vehicle, a supporting vehicle wheel adjacent to each side of the front portion of the vehicle, a grille fixedly mounted upon said chassis in a forwardly spaced relation to said radiator, an upstanding hinge pin supported by said chassis between said radiator and grille, and a twin bonnet structure forming a housing for said engine and radiator and comprising two bonnets each of which has an upper part hinged to the upper portion of said pin and a lower part including an arm hinged to the lower portion of said pin, there being a space below said grille which affords a clearance in which each of said lower arms of said bonnets swings.

7. The subject matter of claim 6, and each of said bonnets having an arcuate opening adjacent to said hinge pin which provides a space occupied by said grille in all positions of each said bonnet.

8. The subject matter of claim 6, and the arm whereby each of said bonnets is hinged to said pin having adjacent to said pin an end portion which is offset from the adjacent end portion of the arm of the other bonnet in order to unobstruct the swinging movements of said bonnets.

9. A motor vehicle structure including a chassis, an engine and radiator supported by said chassis in the front portion of the vehicle, a supporting vehicle wheel adjacent to each side of the front portion of the vehicle, an upstanding hinge pin supported by said chassis in a forwardly adjacent relation to said radiator, twin bonnets which are hinged to said pin and cooperate to form a housing for said radiator and engine, each of said bonnets having adjacent to said hinge pin a grille portion normally in an operative relation to said radiator, an internally projecting resilient catch arm carried by the free side portion of each bonnet comprising the twin structure, each said catch arm extending horizontally into the inclosed portion of the vehicle when the bonnet which carries it is closed, and a dog mounted within said inclosed portion of the vehicle at each side thereof, each said dog normally being positioned for intercepting and interlocking with a cooperating catch arm as the bonnet which carries it approaches the limit of its inswinging movement, said dogs being simultaneously manually operable by an occupant of the vehicle to release them from said catch arms.

10. The subject matter of claim 9 and a bumper mounted upon the front end of the vehicle structure, a horizontally extending catch bar mounted upon said bumper and having a catch shoulder at each side of the mid-width of the vehicle, and a manually operable catch carried by each of said bonnets in an operative relation to the catch shoulder of said catch bar at its side of the vehicle to releasably maintain each bonnet in an outswung position.

11. A motor vehicle structure including a chassis, an engine and radiator supported by said chassis in the front portion of the vehicle, a supporting vehicle wheel adjacent to each side of the front portion of the vehicle, twin bonnets normally positioned to cooperate to form a housing for said radiator and engine, a stationary apron occupying a position between said engine and the adjacent wheel of the chassis over which said twin bonnets swing, each said apron being contoured to cooperate with a part of its associated bonnet, a common locking means for securing said twin bonnets in their operative positions, and a hinge means comprising an upstanding hinge axis common to said bonnets mounted upon said chassis at the midwidth of the vehicle about which said bonnets swing in a horizontal direction to uncover and cover said engine and radiator.

12. The subject matter of claim 11, and each of said bonnets having adjacent to said hinge pin a grille portion normally in an operative relation to said radiator.

13. In an automotive vehicle structure, a chassis, a frame mounted at the midwidth of the front end of said structure, said frame including two vertically spaced apart forwardly projecting arms, the lower of said arms projecting farther forward than the upper one, a bonnet at each side of the midwidth of the vehicle having a pivotal connection with the forward end portions of both of said arms, thereby rendering said bonnet swingable about an axis which inclines from front to rear in relation to the chassis of the vehicle, an operating handle attached externally to the free side portion of each said bonnet, the attaching portion of each said handle having an expanded portion, catch arms having attaching portions which are attached to said expanded portions of each said handle with a portion of each said bonnet intervening therebetween, a wall portion mounted upon said chassis, and latching means carried by said wall portion to cooperate with said catch arms.

14. In an automotive vehicle structure, a chassis, a wall portion mounted upon said chassis, a horizontally swingable bonnet a side portion of which is swingably attached to said wall portion to cover an otherwise open portion thereof, an operating handle attached externally to the free side portion of said bonnet, the attaching portion of said handle having an expanded portion, a catch arm normally to maintain said bonnet closed, said catch arm having an attaching portion which is attached to said expanded portion of said handle with said side portion of the bonnet intervening therebetween, and latching means carried by the aforesaid wall portion to cooperate with said catch arm.

15. A motor vehicle structure including a chassis, an engine and radiator supported by said chassis in the front portion of the vehicle, a supporting vehicle wheel adjacent to each side of the front portion of the vehicle, twin bonnets swingably mounted upon said vehicle structure and normally positioned to cooperate to form a housing for said radiator and engine, said bonnets tending to swing by gravity from their open to their closed position, a bumper mounted upon the front end of the vehicle structure, an elongated vertically extending mounting block girdling said bumper in a secured relation thereto, said block being located at substantially the midwidth of the vehicle, a catch bar extending transversely of the vehicle and having its midlength portion secured to said mounting block, said catch block having a catch shoulder at each end, and catches carried by said bonnets to cooperate with said shoulders of said catch bar at times to maintain said bonnets in their open positions in opposition to gravity.

16. The subject matter of claim 15, and said mounting block having through it an opening into which said catch bar is fitted.

17. In a motor vehicle structure having an engine compartment, a hood having a horizontally swingable attached side portion and positioned to cover at least a portion of said compartment, an internally projecting resilient catch arm carried by the free side portion of said hood, said catch arm having a beveled nose and extending horizontally when the hood which carries it is closed, a weighted dog having a finger portion, a rockable operating shaft extending horizontally and transversely of the vehicle to which said dog is attached, stop means to arrest said dog with its said finger portion in a generally vertical position so that the nose of the aforesaid catch arm may at such time be sprung into a locking relation thereto, and means operable only from the inclosed portion of the vehicle to swing said dog in a direction to release its said finger portion from said catch arm.

18. In a motor vehicle structure having an engine compartment, a hood having a horizontally swingable attached side portion and positioned to cover at least a portion of said compartment, an internally projecting resilient catch arm carried by the free side portion of said hood, said catch arm extending horizontally into the inclosed portion of the vehicle when the hood which carries it is closed, and a dog mounted within said inclosed portion of the vehicle, said dog normally being positioned for intercepting and interlocking with said catch arm as the hood which carries it approaches the limit of its inswinging movement, said dog being manually operable by an occupant of the vehicle to release it from said catch arm.

19. A motor vehicle structure including a chassis, an engine and radiator supported by said chassis in the front portion of the vehicle, a supporting vehicle wheel adjacent to each side of the front portion of the vehicle, an upstanding hinge pin supported by said chassis in a forwardly adjacent relation to said radiator, twin bonnets which are hinged to said pin and cooperate to form a housing for said radiator and engine, each of said bonnets having adjacent to said hinge pin a grille portion normally in an operative relation to said radiator, a bumper mounted upon the front end of the vehicle structure, a horizontally extending catch bar mounted upon said bumper and having a catch shoulder at each side of the midwidth of the vehicle, and a manually operable catch carried by each of said bonnets in an operative relation to the catch shoulder of said catch bar at its side of the vehicle to releasably maintain each bonnet in an outswung position.

20. In a vehicle chassis, a pair of unitary structures each comprising an engine-enclosing part and including a fender, a single hinge pin attaching said unitary structures to swing about an upstanding axis to and from an enclosing relation to said engine, mounting means for said hinge pin comprising a radiator having a forwardly extending arm carried by its upper portion forming a support for the upper part of said hinge pin, and a stationary apron attached to said chassis, said apron occupying a position between said engine and the adjacent wheel of the chassis over which said engine-enclosing parts swing, said apron being contoured to cooperate with a part of said swingable structure.

21. In a vehicle chassis, a pair of unitary structures each comprising an engine-enclosing part and including a fender, a single hinge pin attaching said unitary structures to swing about an upstanding axis to and from an enclosing relation to said engine, mounting means for said hinge pin comprising a radiator having a forwardly extending arm carried by its upper portion forming a support for the upper part of said hinge pin, and common locking means for securing said pair in their operative positions.

22. In a vehicle chassis, a pair of unitary structures each comprising an engine-enclosing part and including a fender, a single hinge pin attaching said unitary structures to swing about an upstanding axis to and from an enclosing relation to said engine, mounting means for said hinge pin comprising a radiator having a forwardly extending arm carried by its upper portion forming a support for the upper part of said hinge pin, a stationary apron attached to said chassis, said apron occupying a position between said engine and the adjacent wheel of the chassis over which said engine-enclosing parts swing, said apron being contoured to cooperate with a part of said swingable structure, and common locking means for securing said pair in their operative positions.

23. In a vehicle chassis, a pair of unitary structures each comprising an engine-enclosing part and including a fender, a single hinge pin coaxially attaching said unitary structures to swing about a common upstanding axis in a substantially horizontal direction to and from an enclosing relation to the engine, mounting means attached to said chassis for supporting said hinge pin, and a stationary apron attached to said chassis, said apron occupying a position between said engine and the adjacent wheel of the chassis over which said engine-enclosing parts swing, said apron being contoured to cooperate with a part of said swingable structure when the latter is in its operative position.

24. In a vehicle chassis, a pair of unitary structures each comprising an engine-enclosing part and including a fender, a single hinge pin coaxially attaching said unitary structures to swing about an upstanding axis to and from an enclosing relation to said engine, mounting means attached to said chassis for supporting said hinge pin, a bar removably mounted on the vehicle chassis, and latch means carried by said bar for securing one engine enclosing part to the other in their operative positions.

25. The subject matter of claim 6, and an apron rigidly attached to said chassis, said apron being contoured to interfit with an overlying portion of said bonnet when the latter is in its operative position.

26. A hood or bonnet member comprising a pair of unitary sheet metal members shaped to cover an end portion of an automotive vehicle, and locking means for securing said pair of sheet metal members together, said locking means comprising a forwardly and rearwardly extending back frame piece carried by said vehicle, a locking barrel having a keyhole secured to said frame piece, each bonnet comprising said pair having in its edge a semi-circular notch in an opposed relation to the other, said opposed notches providing a circular clearance for said barrel, a downwardly projecting locking stud carried by each bonnet, and a turnable handle secured to said barrel, said handle including double locking arms in a fixed relation thereto each engageable with one of said studs.

27. A vehicle having a fixed body structure and including an engine compartment in its rear portion, a pair of twin bonnets which cooperate to form a housing for said compartment, each of said bonnets being hinged to the vehicle and being swingable about a vertical axis, locking means for securing detachably one bonnet to the other comprising a forwardly and rearwardly extending back frame piece removably mounted on the fixed body structure, a locking barrel having a keyhole secured to said frame piece, each bonnet comprising said pair having in its edge a semi-circular notch in an opposed relation to the other, said opposed notches providing a circular clearance for said barrel, a downwardly projecting locking stud carried by each bonnet, and a turnable handle secured to said barrel, said handle including double locking arms in a fixed relation thereto each engageable with one of said studs.

28. In a device of the kind described, a radiator frame having an upper and a lower arm extending forwardly from the front face thereof, a pin supported at an inclination from the vertical by said arms with its upper part located rearwardly of its lower part, and a pair of automobile engine hood bonnets hinged to said pin to swing thereabout as a common axis in a horizontal direction to and from an enclosing relation to the automobile engine.

29. A combined hood and fender member consisting of a sheet metal part, means to hinge said member to the chassis of an automobile structure to swing in a horizontal plane about an upstanding axis located in a vertical plane extending longitudinally along the midwidth of the automobile, said part being one of a twin pair coaxially swingable to and from positions wherein it uncovers parts of the structure which it normally overlies, said hinge means comprising a radiator frame having a forwardly projecting upper and lower arm, said upper arm being shorter than said lower arm and both of said arms being deflected upwardly somewhat near their outer ends, and a hinge pin carried by the deflected portions of said arms.

RENWICK J. SHARP.